Nov. 1, 1927.
W. MORRISON
1,647,649
ELECTROLYTIC RECTIFIER
Filed Oct. 15, 1925
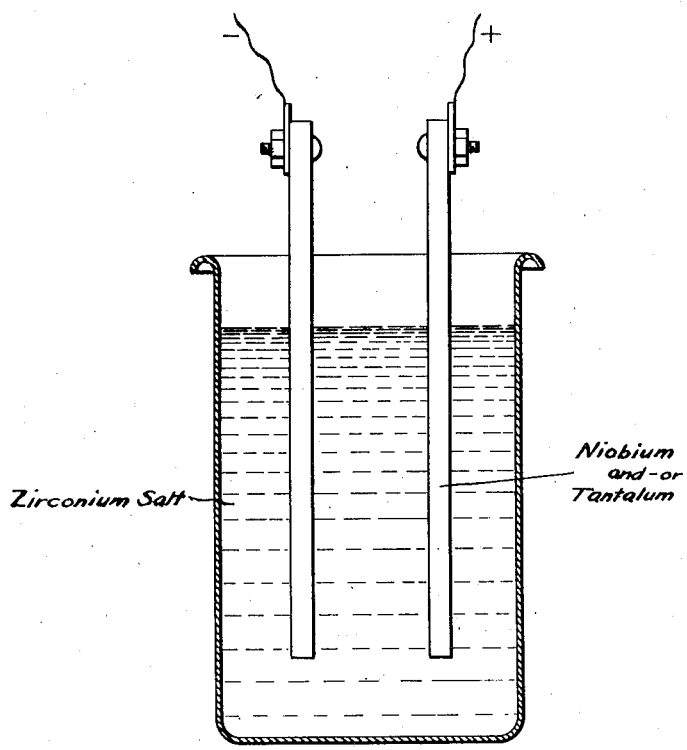
Inventor:
William Morrison,
By Byrnes Townsend Brickenstein,
Attorneys Patented Nov. 1, 1927.

1,647,649

UNITED STATES PATENT OFFICE.

WILLIAM MORRISON, OF CHICAGO, ILLINOIS; MARGRET MORRISON ADMINISTRATRIX OF SAID WILLIAM MORRISON, DECEASED.

ELECTROLYTIC RECTIFIER.

Application filed October 15, 1925. Serial No. 62,660.

My invention relates to an electrolytic rectifier particularly adapted for use in connection with a source of alternating current for furnishing unidirectional current to the elements of tubes used in radio work and for charging storage batteries.

As the filming electrode I use metallic niobium or tantalum, and as the non-filming electrode I use lead, platinum, or any other non-filming metal not materially attacked by the electrolyte, or carbon.

For the electrolyte I use a solution of zirconium sulfate, or zirconium nitrate, though I prefer the sulfate.

I have found that a rectifier so constructed is capable of use with as high difference of potential as 250 volts.

The film formed on the niobium or tantalum plate when operating in a solution as above described is very permanent and unusually resistant to passage of current from the non-filming electrode to the plate.

Instead of niobium or tantalum an alloy of these metals, which alloy in all proportions, may be used, and the use of such alloys is included in this invention.

The accompanying drawing illustrates the described rectifier, the figure being a transverse vertical section through the cell and electrolyte, the electrodes being shown in elevation.

I claim:

1. An electrolytic rectifier having an electrode of material selected from the group consisting of niobium and tantalum, and an electrode of a non-filming conductor in an electrolyte of zirconium sulfate.

2. In an electrolytic rectifier having a filming electrode and a non-filming electrode, an electrolyte of zirconium sulfate.

3. An electrolytic rectifier having an electrode of material selected from the group consisting of niobium and tantalum, and an electrode of a non-filming conductor in an electrolyte of a zirconium salt.

In testimony whereof, I affix my signature.

WILLIAM MORRISON.